(12) United States Patent
Aihara et al.

(10) Patent No.: US 6,387,565 B1
(45) Date of Patent: May 14, 2002

(54) BATTERY HAVING AN ADHESIVE RESIN LAYER CONTAINING A FILLER

(75) Inventors: Shigeru Aihara; Daigo Takemura; Hisashi Shiota; Jun Aragane; Hiroaki Urushibata; Yasuhiro Yoshida; Kouji Hamano; Michio Murai; Takayuki Inuzuka, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/381,272
(22) PCT Filed: Jan. 19, 1998
(86) PCT No.: PCT/JP98/00152
§ 371 Date: Sep. 20, 1999
§ 102(e) Date: Sep. 20, 1999
(87) PCT Pub. No.: WO99/36981
PCT Pub. Date: Jul. 22, 1999

(51) Int. Cl.[7] .................................................. H01M 6/18
(52) U.S. Cl. ........................ 429/145; 429/322; 429/250
(58) Field of Search ........................... 429/231.95, 322, 429/145, 126, 127, 137, 152, 250, 162, 94, 306

(56) References Cited

U.S. PATENT DOCUMENTS

| | | | |
|---|---|---|---|
| 4,220,693 A | | 9/1980 | Di Palma et al. |
| 5,498,489 A | * | 3/1996 | Dasgupta et al. |
| 5,512,389 A | * | 4/1996 | Dasgupta et al. |
| 5,741,609 A | * | 4/1998 | Chen et al. |
| 5,981,107 A | | 11/1999 | Hamano et al. |
| 6,024,773 A | * | 2/2000 | Inuzuka et al. |
| 6,051,342 A | * | 4/2000 | Hamano et al. |
| 6,120,940 A | * | 9/2000 | Poehler et al. |
| 6,124,061 A | * | 9/2000 | Hamano et al. |
| 6,136,471 A | * | 10/2000 | Yoshida et al. |
| 6,232,014 B1 | * | 5/2001 | Shiota et al. |
| 6,235,066 B1 | * | 5/2001 | Inuzuka et al. |

FOREIGN PATENT DOCUMENTS

| | | |
|---|---|---|
| JP | 55-41689 | 3/1980 |
| JP | 62-8471 | 1/1987 |
| JP | 6-168737 | 6/1994 |
| JP | 9-293518 | 11/1997 |

* cited by examiner

Primary Examiner—Gabrielle Brouillette
Assistant Examiner—Susy Tsang
(74) Attorney, Agent, or Firm—Oblon, Spivak, McClelland, Maier & Neustadt, P.C.

(57) ABSTRACT

Conventional batteries are disadvantageous in that a firm outer case must be used to maintain an electrical connection between electrodes, which has been an obstacle to size reduction. Those in which each electrode and a separator are joined with an adhesive resin suffer from conflict between adhesive strength and battery characteristics. To solve these problems, it is an object of the invention to provide a battery which requires no outer case so as to realize reduction in thickness and weight and yet exhibits excellence in both battery characteristics and adhesive strength. A positive electrode, a negative electrode, and a separator are joined via an adhesive resin layer having at least one adhesive resin layer containing a filler. The adhesive resin layer has pores, which are filled with an electrolytic solution to exhibit sufficient ion conductivity thereby to improve battery characteristics and to retain adhesive strength.

23 Claims, 5 Drawing Sheets

BATTERY HAVING AN ADHESIVE RESIN LAYER CONTAINING A FILLER

This application is a 371 of PCT/JP98/00152, filed Jan. 19, 1998.

TECHNICAL FIELD

This invention relates to a battery and, more particularly, to a battery structure that realizes a light and thin battery having a high discharging current at a high current density and satisfactory cycle characteristics.

BACKGROUND OF THE INVENTION

Batteries have been used long as a main power source or a backup power source for a variety of equipment. The demand for batteries has recently been increasing with the development of portable electronic equipment, such as cellular phones and portable personal computers. Primary batteries and secondary batteries are available according to use. As to secondary batteries having great convenience, high performance batteries such as lithium ion secondary batteries and nickel-hydrogen batteries have been attracting attention. The present invention will hereinafter be explained by referring to lithium ion secondary batteries the demand of which has been steeply increasing for use in portable electronic equipment.

Conventional lithium ion secondary batteries comprise a battery body that is a cylindrical roll of an electrode body or a stack of rectangular electrode bodies, the electrode body being composed of a positive electrode, a negative electrode, and a separator that is interposed between the two electrodes to serve for insulation and retention of an electrolyte. The battery body is put in a metal-made case so that the positive electrode, the negative electrode and the separator can be brought into intimate contact by the pressure of the case thereby to maintain the contact between each electrode and the separator.

An electrical contact can be maintained by putting the battery body in a metal-made case, but there is a problem that the case, being made of metal, increases the weight of the battery. Moreover, it is difficult to make a thin metal case. Difficulty in making a thin case has been a great obstacle to fulfillment of the demand for batteries to be used in compact portable equipment.

In this connection, U.S. Pat. No. 5,437,692 discloses a structure in which a lithium ion-conducting polymer is used as an ion conducting layer, and a positive electrode and a negative electrode are joined to the ion-conducting layer with an adhesive layer containing a lithium compound. The inventors of the present invention previously proposed in Japanese Patent Application No. 8-338240 a battery structure requiring no metal-made rigid case and a process for producing the same, in which a positive electrode and a negative electrode are previously joined to a separator with an adhesive resin.

Bonding positive and negative electrodes to a separator with an adhesive resin has made it feasible to maintain an electrical contact among them without imposing an external force. However, being insulating, in nature, an adhesive resin present in the interface between a positive and a negative electrode and a separator tends to shut an electrical flow, i.e., ion conduction.

In bonding a positive and a negative electrode to a separator with an adhesive resin, the adhesive strength tends to increase with the amount of the adhesive resin in the interface. There is a tendency, however, that battery characteristics are deteriorated with an increasing amount of the adhesive resin. That is, conflict between adhesive strength and battery characteristics is observed. As the amount of the adhesive resin increases, the adhesive area tends to increase because the spots of the adhesive resin applied to the interface increase ultimately to form a film covering the interface. As a result, the adhesive strength increases, but, with the interface between electrodes being covered with an insulating film, it seems that ion conducting passages between electrodes are reduced, resulting in deterioration of the battery characteristics. Where, on the other hand, the adhesive resin concentration in a solution type adhesive for bonding is diminished for the purpose of improving battery characteristics, the adhesive resin solution having a reduced viscosity penetrates into the electrodes that are porous only to exhibit low adhesive strength or even fail to bond. It has therefore been a significant theme to improve battery characteristics while retaining adhesive strength.

Electrodes have their surfaces smoothed by pressing but still have unevenness of several microns to form vacancies where a separator and the electrodes are not in contact. The vacancies that should have been filled with an electrolyte may get starved of the electrolyte, which depends on the amount of the electrolyte supplied and the condition of use of the battery. Starvation of the electrolyte leads to an increase of internal resistivity of the battery and reductions in battery characteristics.

The present invention has been reached, aiming at settlement of the above-described problems. It is an object of the invention to provide a light and thin battery which has improved battery characteristics while securing adhesive strength.

DISCLOSURE OF THE INVENTION

A first battery according to the invention comprises a battery body having a positive and a negative electrode containing an active material, a separator holding an electrolyte, and an adhesive resin layer joining the positive and the negative electrodes to the separator, wherein the adhesive resin layer is composed of at least one layer and contains a filler. According to this structure, the filler added makes the adhesive resin layer porous. The electrolyte and the adhesive resin solution can be held in the pores so that satisfactory battery characteristics can be obtained while securing adhesive strength.

A second battery according to the invention is the above-described first battery, wherein the electrolyte is an organic electrolyte containing lithium ions. This mode, when applied to lithium ion secondary batteries which are required to have reduced weight and thickness, provides a high performance compact battery.

A third battery according to the invention is the above-described first battery, wherein the average particle size of the filler is equal to or smaller than the particle size of the active material of the positive and negative electrodes. According to this mode, the adhesive resin solution is held by the adhesive resin layer to give necessary adhesive strength.

A fourth battery according to the invention is the above-described first battery, wherein the average particle size of the filler is 1 $\mu$m or smaller. According to this embodiment, the filler manifests a proper thickening effect for the adhesive resin solution and makes the adhesive resin layer porous thereby to secure satisfactory battery characteristics while retaining adhesive strength.

A fifth battery according to the invention is the above-described first battery, wherein the sum of a volume ratio of the adhesive resin and that of the filler per unit volume of the adhesive resin layer is less than 1. This mode secures the porosity of the formed adhesive resin layer.

A sixth battery according to the invention is the above-described first battery, wherein the sum of a volume ratio of the adhesive resin and that of the filler per unit volume of the adhesive resin layer is 0.2 to 0.8. According to this embodiment, the voids of the porous adhesive resin are filled with the electrolyte to exhibit sufficient ion conductivity.

A seventh battery according to the invention is the above-described first battery, wherein the filler comprises at least one of non-conductive materials and semiconductors. According to this mode, the adhesive resin layer can be made porous to provide satisfactory battery characteristics while retaining adhesive strength.

An eighth battery according to the invention is the above-described first battery, wherein the adhesive resin layer comprises a layer containing an electrically conductive filler and a layer containing at least one of non-conductive materials and semiconductors. According to this embodiment, the conductive filler-containing layer functions to diminish the internal resistivity of the battery.

A ninth battery according to the invention is the above-described first battery, wherein the adhesive resin layer is constituted so as to fill the vacancies formed in the interface between each electrode and the separator due to the unevenness of the electrode and the separator. This structure is effective in increasing the adhesive strength and preventing reduction of battery characteristics due to starvation of the electrolyte.

A tenth battery according to the invention is the above-described first battery, wherein the battery body is a laminate of a plurality of electrode bodies each composed of a single layer of the positive electrode, a single layer of the separator, and a single layer of the negative electrode.

An eleventh battery according to the invention is the above-described tenth battery, wherein the laminate is formed by interposing the positive electrode and the negative electrode alternately among a plurality of the separators.

A twelfth battery according to the invention is the above-described tenth battery, wherein the laminate is formed by interposing the positive electrode and the negative electrode alternately between rolled separators.

A thirteenth battery according to the invention is the above-described tenth battery, wherein the laminate is formed by interposing the positive electrode and the negative electrode alternately between folded separators.

The tenth to thirteenth embodiments are effective in providing a laminated electrode type battery having high performance and a high battery capacity.

THE BEST MODE FOR CARRYING OUT THE INVENTION

Figure 1:
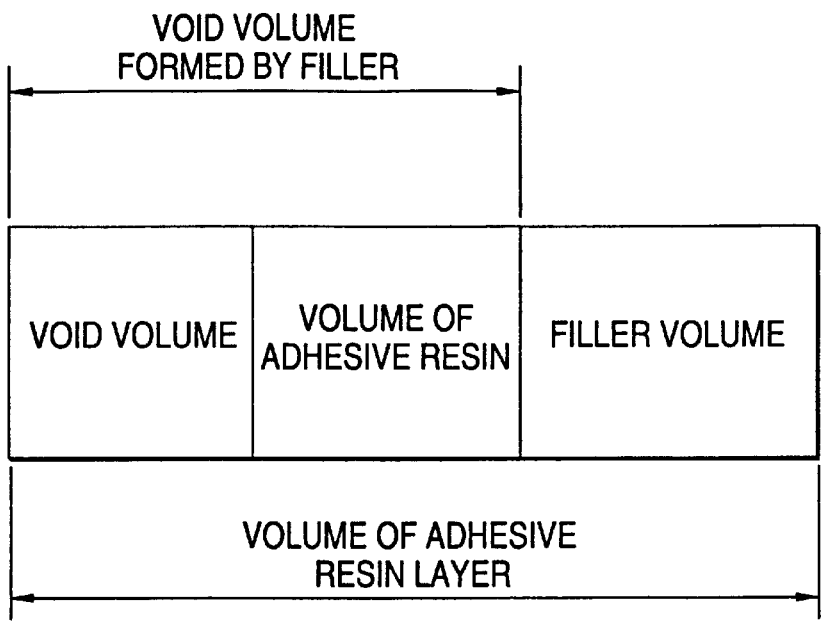
FIG. 1 is a diagram showing the volume ratio in the adhesive resin layer of the battery according to the invention.

The modes for carrying out the invention are hereinafter described by referring to the drawings.

Where a positive and a negative electrode are bonded to a separator with an adhesive resin, ion conductivity is lessened to deteriorate battery characteristics according as the amount of the adhesive resin is increased for strengthening the adhesion. This is because the adhesive resin layer is formed in a film to block the passages for ion migration. Therefore, the problem ought to be solved only if the adhesive resin is not filmy but porous. The present invention consists in incorporating a filler into the adhesive resin so as to make the adhesive resin layer porous.

If an adhesive resin solution containing no filler is applied to an electrode or a separator for bonding, the adhesive resin solution will be absorbed by the adherents, particularly the electrode that is porous. Where a filler is mixed into the adhesive resin solution, the adhesive resin itself is given a porous structure by the filler to provide pores. Since the adhesive resin solution is held in the pores and thereby prevented from being absorbed by the electrode, the adhesive resin solution can be retained on the adherend surface. Further, this effect brings about an increase in viscosity of the adhesive resin solution to further improve adhesive holding properties.

The average particle size of the filler to be added is preferably not greater than that of the electrode active material, particularly 1 $\mu$m or smaller. Filler particles having an average particle size of greater than 1 $\mu$m form pores the diameter of which approximates the pore size of the electrode, and the ability of holding the electrolytic solution decreases. Where filler particles have an average particle size equal to or greater than the particle size of the active material, the pores lose the ability of holding the electrolyte, resulting in reductions of battery characteristics. That is, the filler added produces no substantial effect. The sedimentation velocity of the filler particles increases with an increasing average particle size, which considerably deteriorates the handling properties of the adhesive resin solution. With the average particle size being 1 $\mu$m or smaller, the filler moderately increases the viscosity of the adhesive resin solution and makes the adhesive resin layer porous. The adhesive resin solution and the electrolytic solution can thus be held in the electrode/separator interface.

The preference for the above-specified particle size of the filler applies to the particles constituting the most part of the filler. It does not matter if the filler contains particles out of that range.

An adhesive resin solution using a solution type adhesive resin is made up of a filler, an adhesive resin, and a solvent. Since the solvent is removed on drying, the adhesive resin layer is composed of the filler, the adhesive resin, and the voids formed on solvent's drying. The constitution of the adhesive resin layer is illustrated in FIG. 1. As can be seen from FIG. 1, the void volume formed by the filler is made up of the volume of the adhesive resin and the volume of the voids formed on solvent's drying. If all the void volume formed by the filler is filled with the adhesive resin, the adhesive resin layer fails to retain its porosity and becomes an insulating layer. Hence, the sum of a volume ratio of the adhesive resin and that of the filler per unit volume of the adhesive resin layer should be less than 1.

In order for the adhesive resin layer to retain porosity, it is required as stated above that the sum of a volume ratio of the adhesive resin and that of the filler per unit volume of the adhesive resin layer be less than 1. On the other hand, in order for the voids of the porous adhesive resin to be filled with an electrolytic solution to exhibit sufficient ion conductivity, it is desirable for the adhesive resin layer to have approximately the same void volume as the separator used. From this standpoint, the sum of a volume ratio of the adhesive-resin and that of the filler per unit volume of the adhesive resin layer should be 0.2 to 0.8. In other words the volume percentage of the voids based on the adhesive resin layer should be 20% to 80%.

The filler is not particularly limited in material as far as the above-specified average particle size can be realized. Inorganic substances such as oxides, e.g., $Al_2O_3$, $SiO_2$, $ZrO_2$, and $LiAlO_2$, carbides, e.g., SiC, $B_4C$, and ZrC, and nitrides, e.g., SiN, BN, and TiN, are stable in an electrolyte and, because they have low conductivity, there is no fear of a short circuit in case the adhesive resin containing the filler should be present to connect the electrodes. Polymers such as polyolefin resins have not only low conductivity but a small specific gravity, they are effective in minimizing an increase of weight as compared with inorganic fillers or metallic fillers.

Figure 2:
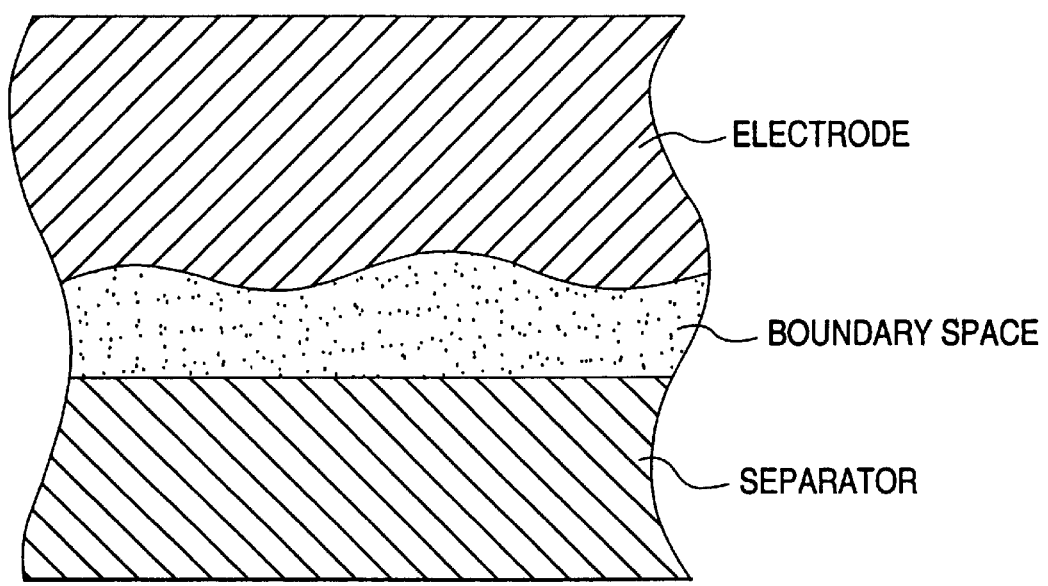
FIG. 2 is a schematic cross-sectional view showing the space formed in the interface between an electrode and a separator in the battery according to the invention.

An inorganic salt, such as $LiPF_6$ or $LiClO_4$, that does not dissolve in an electrolytic solution or remains undissolved can serve as a filler to form fine pores. Even where the inorganic salt dissolves in an electrolytic solution, it leaves pores in the adhesive resin layer after dissolving, making it possible to increase the porosity of the adhesive resin layer.

Where a conductive filler, such as carbon or metal, is used, the adhesive resin layer is endowed with electrical conductivity. The adhesive resin layer thus having conductivity, electron conduction is not hindered even if the adhesive resin enters the interstices of an electrode. However, use of such a conductive material as carbon necessitates some manipulation for prevention of a short circuit. A short circuit can be prevented by, for example, joining an electrode and a separator via a double-layered adhesive resin layer composed of an adhesive resin layer containing a conductive material that is in contact with the electrode and an adhesive resin layer containing inorganic matter that is in contact with the separator.

Where the space existing in the electrode/separator interface is filled with the filler-containing adhesive resin, the adhesive strength increases, and reduction in battery characteristics due to shortage of the electrolyte can be prevented. Because the surface of an electrode has not a little unevenness on the order of several microns, it is desirable that the filler-containing adhesive resin be present so as to fill the gap as shown in FIG. 2. Supposing an allowable reduction in discharge capacity due to resistance of the adhesive resin layer is up to 50%, a desirable thickness of the adhesive resin layer is 50 $\mu$m or smaller. In order to minimize the reduction in discharge capacity, a more desirable thickness of the adhesive resin layer is 10 $\mu$m or smaller.

While the shape of the filler to be added to the adhesive resin is not particularly limited, it includes a spherical shape, an elliptical shape, a fibrous shape, and a flaky shape. A spherical filler will achieve an increased packing density, making the adhesive resin layer thinner. An elliptical, fibrous or flaky filler has an increased specific surface area to increase the void volume of the adhesive resin layer.

While the adhesive resin is not particularly limited in kind, materials which, when present in battery materials, are not corroded by an electrolyte or an electrode-forming material and are capable of retaining adhesiveness are preferred. In particular, adhesive resins of solution type are more effective, for the adhesive resin layer can easily be made porous. In lithium ion secondary batteries containing an organic electrolyte, fluorocarbon resins represented by polyvinylidene fluoride (PVDF) and polymers containing polyvinyl alcohol in the molecular structure thereof, represented by polyvinyl alcohol, are preferred.

While not limiting, the adhesive resin is preferably applied in a manner agreeable with a desired thickness and a coating form. Illustrative examples of coating methods include screen printing, bar coating, roll coating, gravure coating, and doctor blade coating.

The invention does not impose particular restriction on the structure of batteries to which the invention is applied. The invention is applicable to batteries having a battery body comprising a positive electrode, a negative electrode, a separator, and an adhesive resin layer joining the positive and the negative electrodes to the separator. Accordingly, the battery body can be an electrode body composed of a single positive electrode layer, a single separator, and a single negative electrode layer (hereinafter referred to as a unit electrode body) or a laminated battery body comprising a plurality of such unit electrode bodies. When the invention is applied to a battery having such a laminated battery body, there is provided a battery having high performance and a high battery capacity.

The laminated battery body can be formed by laying a plurality of positive electrodes, separators, and negative electrodes all cut in sizes or by rolling or folding one or more than one continuous sets of a positive electrode, a separator, and a negative electrode.

The present invention is especially effective when applied to lithium secondary batteries, which is not limiting the application of the invention. The invention is also applicable to primary batteries, such as lithium primary batteries, manganese-zinc batteries, and silver-zinc batteries; and other types of secondary batteries, such as nickel-cadmium batteries, nickel-zinc batteries, nickel-hydrogen batteries, polymer batteries, and carbon secondary batteries.

The details of the invention will now hereinafter be given by way of Examples, but the invention is by no means limited thereto.

EXAMPLE 1

Preparation of Electrode Body

A positive electrode active material layer consisting of 91 parts by weight of $LiCoO_2$ having an average particle size of 10 $\mu$m (produced by Nippon Chemical Industrial Co., Ltd.), 6 parts by weight of graphite powder (produced by Lonza Ltd.), and 3 parts by weight of polyvinylidene fluoride (produced by Kureha Chemical Industry Co., Ltd.) was applied to an aluminum foil substrate to an average coating thickness of 80 $\mu$m to form a positive electrode. A negative electrode active material layer consisting of 90 parts by weight of mesophase microbeads (produced by Osaka Gas Co., Ltd.) having an average particle size of 8 $\mu$m and 10 parts by weight of polyvinylidene fluoride was applied to a copper substrate to an average coating thickness of 80 µm to form a negative electrode. An adhesive resin solution for joining these electrodes to a polypropylene/polyethylene/polypropylene three-layered separator (produced by Hoechst Celanese Corporation) was prepared by dispersing and dissolving polyvinylidene fluoride (produced by Elf Atochem Japan) and alumina powder having an average particle size of 0.01 µm (produced by Degussa Corporation) in a concentration of 10 wt % each in N-methylpyrrolidone. The positive electrode, the negative electrode, and the separator were cut in sizes of 50 mm×50 mm, 55 mm×55 mm, and 60 mm×60 mm, respectively. Both sides of the cut piece of the separator were coated with the adhesive resin solution on a screen printing machine using a 300 mesh screen, and the cut positive electrode and the cut negative electrode were stuck thereto. The laminate was dried in a drier at 80° C. for 1 hour to prepare a unit electrode body.

Evaluation of electrode body:

1) Measurement of adhesive strength (peel strength)

The adhesive strength between the negative electrode and the separator of the resulting electrode body was measured by a peel test at 180°.

2) Measurement of battery characteristics

The resulting electrode body, with a current collecting tab spot-welded to the positive and the negative electrodes thereof, was put in a bag made of an aluminum laminate sheet. An electrolytic solution was poured into the bag, and the opening of the bag was sealed to complete a battery. The battery was charged and discharged at 1C, and a discharge capacity was measured as a battery characteristic.

Comparative Example 1

Electrodes were prepared, a battery was assembled, and evaluation was made in the same manner as in Example 1, except for using an adhesive resin solution prepared by dissolving polyvinylidene fluoride (PVDF) in N-methylpyrrolidone (NMP) in a concentration of 10 wt %.

EXAMPLE 2

Electrodes were prepared, a battery was assembled, and evaluation was made in the same manner as in Example 1, except for using an adhesive resin solution prepared by dissolving 2 wt % of polyvinyl alcohol and 5 wt % of alumina powder having an average particle size of 0.01 µm in N-methylpyrrolidone.

Comparative Example 2

Electrodes were prepared, a battery was assembled, and evaluation was made in the same manner as in Example 2, except for using an adhesive resin solution prepared by dissolving 2 wt % of polyvinyl alcohol in N-methylpyrrolidone.

EXAMPLE 3

Electrodes were prepared, a battery was assembled, and evaluation was made in the same manner as in Example 1, except for using an adhesive resin solution prepared by dissolving and dispersing 10 wt % of polyvinylidene fluoride and 10 wt % of alumina powder having an average particle size of 0.1 µm in N-methylpyrrolidone.

EXAMPLE 4

Electrodes were prepared, a battery was assembled, and evaluation was made in the same manner as in Example 1, except for using an adhesive resin solution prepared by dissolving and dispersing 10 wt % of polyvinylidene fluoride and 10 wt % of alumina powder having an average particle size of 1 µm in N-methylpyrrolidone.

EXAMPLE 5

Electrodes were prepared, a battery was assembled, and evaluation was made in the same manner as in Example 1, except for using an adhesive resin solution prepared by dissolving and dispersing 10 wt % of polyvinylidene fluoride and 10 wt % of silica powder having an average particle size of 0.007 µm in N-methylpyrrolidone.

Comparative Example 3

Electrodes were prepared, a battery was assembled, and evaluation was made in the same manner as in Example 1, except for using an adhesive resin solution prepared by dissolving and dispersing 10 wt % of polyvinylidene fluoride and 10 wt % of alumina powder having an average particle size of 10 µm in N-methylpyrrolidone.

EXAMPLE 6

Electrodes were prepared, a battery was assembled, and evaluation was made in the same manner as in Example 1, except for using an adhesive resin solution prepared by dissolving and dispersing 10 wt % of polyvinylidene fluoride and 5 wt % of alumina powder having an average particle size of 0.01 µm in N-methylpyrrolidone.

EXAMPLE 7

Electrodes were prepared, a battery was assembled, and evaluation was made in the same manner as in Example 1, except for using an adhesive resin solution prepared by dissolving and dispersing 5 wt % of polyvinylidene fluoride and 25 wt % of alumina powder having an average particle size of 0.01 µm in N-methylpyrrolidone.

Comparative Example 4

Electrodes were prepared, a battery was assembled, and evaluation was made in the same manner as in Example 1, except for using an adhesive resin solution prepared by dissolving and dispersing 10 wt % of polyvinylidene fluoride and 1 wt % of alumina powder having an average particle size of 0.01 µm in N-methylpyrrolidone.

Comparative Example 5

Electrodes were prepared, a battery was assembled, and evaluation was made in the same manner as in Example 1, except for using an adhesive resin solution prepared by dissolving and dispersing 3 wt % of polyvinylidene fluoride and 30 wt % of alumina powder having an average particle size of 0.01 µm in N-methylpyrrolidone.

EXAMPLE 8

Electrodes were prepared, a battery was assembled, and evaluation was made in the same manner as in Example 1, except for using an adhesive resin solution prepared by dissolving and dispersing 10 wt % of polyvinylidene fluoride and 10 wt % of alumina powder having an average particle size of 0.01 µm in N-methylpyrrolidone and using a 250 mesh screen for applying the adhesive resin solution.

EXAMPLE 9

Electrodes were prepared, a battery was assembled, and evaluation was made in the same manner as in Example 1, except for using an adhesive resin solution prepared by dissolving and dispersing 10 wt % of polyvinylidene fluoride and 10 wt % of alumina powder having an average particle size of 0.01 µm in N-methylpyrrolidone and using a 200 mesh screen for applying the adhesive resin solution.

EXAMPLE 10

Electrodes were prepared, a battery was assembled, and evaluation was made in the same manner as in Example 1, except for using an adhesive resin solution prepared by dissolving and dispersing 10 wt % of polyvinylidene fluoride and 10 wt % of alumina powder having an average particle size of 0.01 μm in N-methylpyrrolidone and using a 100 mesh screen for applying the adhesive resin solution.

Comparative Example 6

Electrodes were prepared, a battery was assembled, and evaluation was made in the same manner as in Example 1, except that an adhesive resin solution prepared by dissolving and dispersing 10 wt % of polyvinylidene fluoride and 10 wt % of alumina powder having an average particle size of 0.01 μm in N-methylpyrrolidone was used and that the adhesive resin solution was applied twice using a 50 mesh screen in screen printing.

EXAMPLE 11

Electrodes were prepared, a battery was assembled, and evaluation was made in the same manner as in Example 1, except for using an adhesive resin solution prepared by dissolving and dispersing 10 wt % of polyvinylidene fluoride and 10 wt % of silica powder having an average particle size of 0.01 μm (produced by Aerosil Co., Ltd.) in N-methylpyrrolidone.

EXAMPLE 12

Electrodes were prepared, a battery was assembled, and evaluation was made in the same manner as in Example 1, except for using an adhesive resin solution prepared by dissolving and dispersing 10 wt % of polyvinylidene fluoride and 30 wt % of silicon carbide powder having an average particle size of 0.5 μm (produced by Seimi Chemical Co., Ltd.) in N-methylpyrrolidone.

EXAMPLE 13

Electrodes were prepared, a battery was assembled, and evaluation was made in the same manner as in Example 1, except for using an adhesive resin solution prepared by dissolving and dispersing 10 wt % of polyvinylidene fluoride and 30 wt % of boron carbide powder having an average particle size of 0.5 μm (produced by Seimi Chemical Co., Ltd.) in N-methylpyrrolidone.

EXAMPLE 14

Electrodes were prepared, a battery was assembled, and evaluation was made in the same manner as in Example 1, except for using an adhesive resin solution prepared by dissolving and dispersing 10 wt % of polyvinylidene fluoride and 30 wt % of silicon nitride powder having an average particle size of 0.5 μm (produced by Seimi Chemical Co., Ltd.) in N-methylpyrrolidone.

EXAMPLE 15

Electrodes were prepared, a battery was assembled, and evaluation was made in the same manner as in Example 1, except for using an adhesive resin solution prepared by dissolving and dispersing 10 wt % of polyvinylidene fluoride and 5 wt % of polymethyl methacrylate (PMMA) powder having an average particle size of 0.5 μm in N-methylpyrrolidone.

EXAMPLE 16

Electrodes were prepared, a battery was assembled, and evaluation was made in the same manner as in Example 1, except for using an adhesive resin solution prepared by dissolving and dispersing 10 wt % of polyvinylidene fluoride and 20 wt % of iron powder having an average particle size of 0.5 μm in N-methylpyrrolidone.

EXAMPLE 17

Electrodes were prepared, a battery was assembled, and evaluation was made in the same manner as in Example 1, except for using an adhesive resin solution prepared by dissolving and dispersing 10 wt % of polyvinylidene fluoride and 50 wt % of carbon powder having an average particle size of 1 μm (produced by Osaka Gas Co., Ltd.) in N-methylpyrrolidone.

EXAMPLE 18

Electrodes were prepared, a battery was assembled, and evaluation was made in the same manner as in Example 1, except for using an adhesive resin solution prepared by dissolving and dispersing 10 wt % of polyvinylidene fluoride, 9 wt % of alumina powder having an average particle size of 0.01 μm, and 1 wt % of alumina powder having an average particle size of 1 μm in N-methylpyrrolidone.

EXAMPLE 19

Electrodes were prepared, a battery was assembled, and evaluation was made in the same manner as in Example 1, except for using an adhesive resin solution prepared by dissolving and dispersing 10 wt % of polyvinylidene fluoride, 5 wt % of alumina powder having an average particle size of 0.01 μm, and 5 wt % of silica powder having an average particle size of 0.01 μm in N-methylpyrrolidone.

EXAMPLE 20

Electrodes were prepared, a battery was assembled, and evaluation was made in the same manner as in Example 1, except for using an adhesive resin solution prepared by dissolving and dispersing 10 wt % of polyvinylidene fluoride, 9 wt % of alumina powder having an average particle size of 0.01 μm, and 1 wt % of silica powder having an average particle size of 0.5 μm in N-methylpyrrolidone.

EXAMPLE 21

Electrodes were prepared, a battery was assembled, and evaluation was made in the same manner as in Example 1, except for using an adhesive resin solution prepared by dissolving and dispersing 10 wt % of polyvinylidene fluoride, 9 wt % of alumina powder having an average particle size of 0.01 μm, and 1 wt % of polymethyl methacrylate (PMMA) powder having an average particle size of 0.5 μm in N-methylpyrrolidone.

EXAMPLE 22

Electrodes were prepared, a battery was assembled, and evaluation was made in the same manner as in Example 1, except for using an adhesive resin solution prepared by dissolving and dispersing 10 wt % of polyvinylidene fluoride, 9 wt % of alumina powder having an average particle size of 0.01 μm, and 1 wt % of iron powder having an average particle size of 0.5 μm in N-methylpyrrolidone.

EXAMPLE 23

Electrodes were prepared, a battery was assembled, and evaluation was made in the same manner as in Example 1, except for using an adhesive resin solution prepared by dissolving and dispersing 10 wt % of polyvinylidene fluoride, 9 wt % of alumina powder having an average particle size of 0.01 μm, and 1 wt % of carbon powder having an average particle size of 1 μm in N-methylpyrrolidone.

EXAMPLE 24

Electrodes were prepared, a battery was assembled, and evaluation was made in the same manner as in Example 1, except for using an adhesive resin solution prepared by dissolving and dispersing 10 wt % of polyvinylidene fluoride, 9 wt % of alumina powder having an average particle size of 0.01 μm, and 1 wt % of alumina powder having an average particle size of 0.5 μm in N-methylpyrrolidone.

EXAMPLE 25

Electrodes were prepared, a battery was assembled, and evaluation was made in the same manner as in Example 1, except for using an adhesive resin solution prepared by dissolving and dispersing 10 wt % of polyvinylidene fluoride, 5 wt % of silicon carbide powder having an average particle size of 0.5 μm, and 5 wt % of polymethyl methacrylate powder having an average particle size of 0.5 μm in N-methylpyrrolidone.

EXAMPLE 26

Electrodes were prepared, a battery was assembled, and evaluation was made in the same manner as in Example 1, except for using an adhesive resin solution prepared by dissolving and dispersing 10 wt % of polyvinylidene fluoride, 5 wt % of iron powder having an average particle size of 0.5 μm, and 5 wt % of polymethyl methacrylate powder having an average particle size of 0.5 μm in N-methylpyrrolidone.

EXAMPLE 27

Electrodes were prepared, a battery was assembled, and evaluation was made in the same manner as in Example 1, except for using an adhesive resin solution prepared by dissolving and dispersing 10 wt % of polyvinylidene fluoride, 5 wt % of carbon powder having an average particle size of 0.5 μm, and 5 wt % of polymethyl methacrylate powder having an average particle size of 0.5 μm in N-methylpyrrolidone.

EXAMPLE 28

A positive electrode, a negative electrode, and an adhesive resin solution were prepared in the same manner as in Example 1. The positive electrode, the negative electrode, and a separator were cut in pieces of 50 mm×50 mm, 55 mm×55 mm, and 120 mm×60 mm, respectively. The adhesive resin solution was applied to one side of the cut sheet of the separator on a screen printing machine. The separator was folded in two with a cut piece of the negative electrode inserted into the center of the fold and passed through a two-roll laminator to prepare a negative electrode with separators. The adhesive resin solution was applied to one of the separator surfaces having the negative electrode therein, and a cut piece of the positive electrode was adhered thereto. The adhesive resin solution was applied to a side of another folded separator having a cut piece of the negative electrode interposed therein, and the coated separator was stuck to the previously adhered positive electrode. These steps were repeated 6 times to build up a laminated battery body. The battery body was dried while applying pressure to obtain a tabular laminated battery body having positive and negative electrodes bonded to the separators. The battery characteristics of the resulting battery body were evaluated in the same manner as in Example 1.

EXAMPLE 29

A positive electrode, a negative electrode, and an adhesive resin solution were prepared in the same manner as in Example 1. The positive electrode, the negative electrode, and a separator were cut in pieces of 50 mm×50 mm, 55 mm×55 mm, and 120 mm×60 mm, respectively. The adhesive resin solution was applied to a side of the cut sheet of the separator on a screen printing machine. The separator was folded in two with a cut piece of the positive electrode inserted into the center of the fold and passed through a two-roll laminator to prepare a positive electrode with separators. The adhesive resin solution was applied to one of the separator surfaces having the positive electrode therein, and a cut piece of the negative electrode was adhered thereto. The adhesive resin solution was applied to a side of another folded separator having a cut piece of the positive electrode interposed therein, and the coated separator was stuck to the previously adhered negative electrode. These steps were repeated 6 times to build up a laminated battery body. The battery body was dried while applying pressure to obtain a tabular laminated battery body having positive and negative electrodes bonded to separators. The battery characteristics of the resulting battery body were evaluated in the same manner as in Example 1.

EXAMPLE 30

A positive electrode, a negative electrode, and an adhesive resin solution were prepared in the same manner as in Example 1. The positive electrode, the negative electrode, and a separator were cut in sizes of 300 mm×50 mm, 305 mm×55 mm, and 620 mm×60 mm, respectively. The adhesive resin solution was applied to a side of a cut sheet of the separator on a screen printing machine. The separator was folded in two with a cut sheet of the negative electrode inserted into the center of the fold and passed through a two-roll laminator to prepare a negative electrode of band form with a separator on both sides thereof. The adhesive resin solution was applied to one of the separator surfaces having the negative electrode therein, and one end of the negative electrode with separators was folded back at a prescribed length with a cut sheet of the positive electrode inserted into the fold. Subsequently, the positive electrode and the negative electrode with separators were superposed and passed through the laminator. The adhesive resin solution was applied to the other separator on the side opposite to the side previously coated with the adhesive resin solution, and the laminate was rolled up into an oblong cylinder.

The rolled oblong battery body was dried while applying pressure to obtain a tabular roll type battery body having positive and negative electrodes bonded to separators. The battery characteristics of the resulting battery body were evaluated in the same manner as in Example 1.

EXAMPLE 31

A positive electrode, a negative electrode, and an adhesive resin solution were prepared in the same manner as in Example 1. The positive electrode, the negative electrode, and a separator were cut in sizes of 300 mm×50 mm, 305 mm×55 mm, and 620 mm×60 mm, respectively. The adhesive resin solution was applied to one side of the separator on a screen printing machine. The separator was folded in two with a cut sheet of the positive electrode inserted into the center of the fold and passed through a two-roll laminator to prepare a positive electrode with a separator on both sides thereof. The adhesive resin solution was applied to one of the separator surfaces having the positive electrode therein, and one end of the positive electrode with separators was folded back at a prescribed length with a cut sheet of the negative electrode inserted into the fold. Subsequently, the negative electrode and the positive electrode with separators were superposed and passed through the laminator. The adhesive resin solution was applied to the other separator on the side opposite to the side previously coated with the adhesive resin solution, and the laminate was rolled up into an oblong cylinder.

The rolled oblong battery-body was dried while applying pressure to obtain a tabular roll type battery body having positive and negative electrodes bonded to separators. The battery characteristics of the resulting battery body were evaluated in the same manner as in Example 1.

EXAMPLE 32

A positive electrode, a negative electrode, and an adhesive resin solution were prepared in the same manner as in Example 1. The positive electrode, the negative electrode, and a separator were cut in sizes of 300 mm×50 mm, 305 mm×55 mm, and 310 mm×60 mm, respectively. A pair of cut bands of the separator were arranged over both sides of a cut band of the negative electrode, and a cut sheet of the positive electrode was arranged on the outer side of one of the separators. The adhesive resin solution had been applied to both sides of the separator positioned between the negative electrode and the positive electrode and the side of the other separator that was facing the negative electrode. Preceded by a prescribed length of the positive electrode, the positive electrode, the separators, and the negative electrode were superposed and passed through a laminator to form a laminate of band form. The separator surface of the laminate band was coated with the adhesive resin solution. The sticking end of the positive electrode was folded back on the coated side, and the laminate was rolled up into an oblong cylinder in such a manner that the folded part might be wrapped in.

The rolled oblong battery body was dried while applying pressure to obtain a tabular roll type battery body having positive and negative electrodes bonded to separators. The battery characteristics of the resulting battery body were evaluated in the same manner as in Example 1.

EXAMPLE 33

A positive electrode, a negative electrode, and an adhesive resin solution were prepared in the same manner as in Example 1. The positive electrode, the negative electrode, and a separator were cut in sizes of 300 mm×50 mm, 305 mm×55 mm, and 310 mm×60 mm, respectively. A pair of cut bands of the separator were arranged over both sides of a cut band of the positive electrode, and a cut sheet of the negative electrode was arranged on the outer side of one of the separators. The adhesive resin solution was applied to both sides of the separator positioned between the negative electrode and the positive electrode and the side of the other separator that was facing the positive electrode. Preceded by a prescribed length of the negative electrode, the positive electrode, the separators, and the negative electrode were superposed and passed through a laminator to form a laminate of band form- The separator surface of the laminate band was coated with the adhesive resin solution. The sticking end of the negative electrode was folded back on the coated side, and the laminate was rolled up into an oblong cylinder in such a manner that the folded part might be wrapped in.

The rolled oblong battery body was dried while applying pressure to obtain a tabular roll type battery body having positive and negative electrodes bonded to separators. The battery characteristics of the resulting battery body were evaluated in the same manner as in Example 1.

Figure 3:
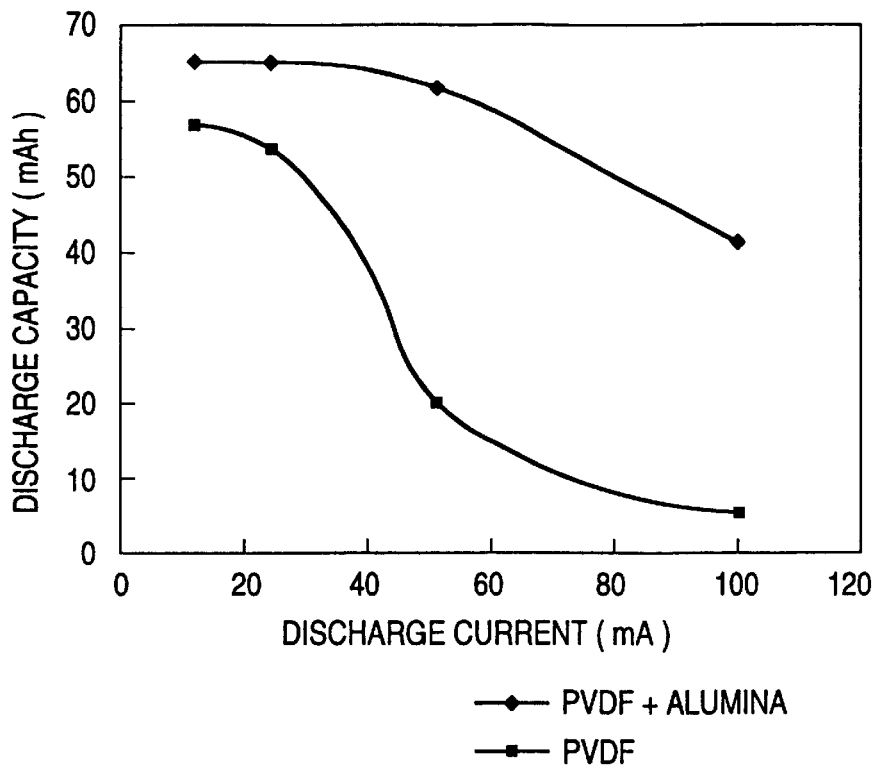
FIG. 3 is a graph showing the change in discharge capacity brought about by addition of an alumina filler to a PVDF resin.
Figure 4:
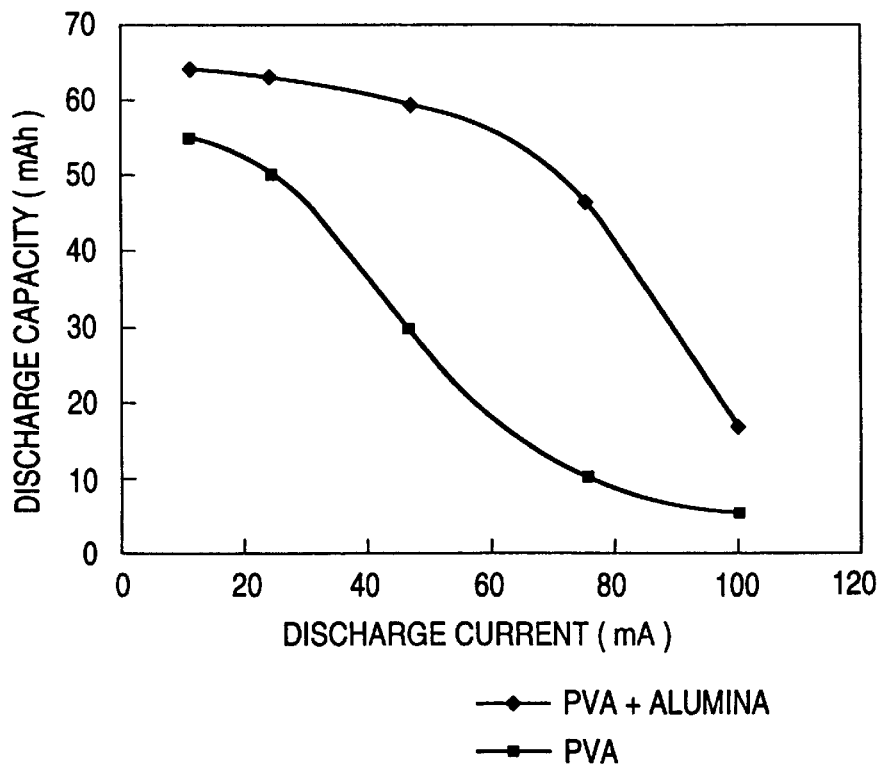
FIG. 4 is a graph showing the change in discharge capacity caused by addition of an alumina filler to a PVA resin.

The adhesive strength of the prepared electrodes and the discharge capacity in charging and discharging the prepared batteries at 1C are shown in Tables 1 through 7. The graphs of discharge capacity vs. charging and discharging current with different adhesive resins are shown in FIGS. 3 and 4. Comparisons between Example 1 and Comparative Example 1 and between Example 2 and Comparative Example 2 reveal that addition of a filler to an adhesive resin solution brings about improvement in discharge capacity, especially under a high load.

TABLE 1

| | Adhesive | | | | | |
|---|---|---|---|---|---|---|
| | Resin | Filler | Weight Ratio | Particle Size of Filler | Peel Strength (gf/cm) | Discharge Capacity (1C) (mAh) |
| Example 1 | PVDF | alumina | 1:1 | 0.01 | 50 | 60 |
| Compara. Example 1 | PVDF | none | — | — | 100 | 20 |
| Example 2 | PVA | alumina | 2:5 | 0.01 | 70 | 60 |
| Compara. Example 2 | PVA | none | — | — | 100 | 30 |

Figure 5:
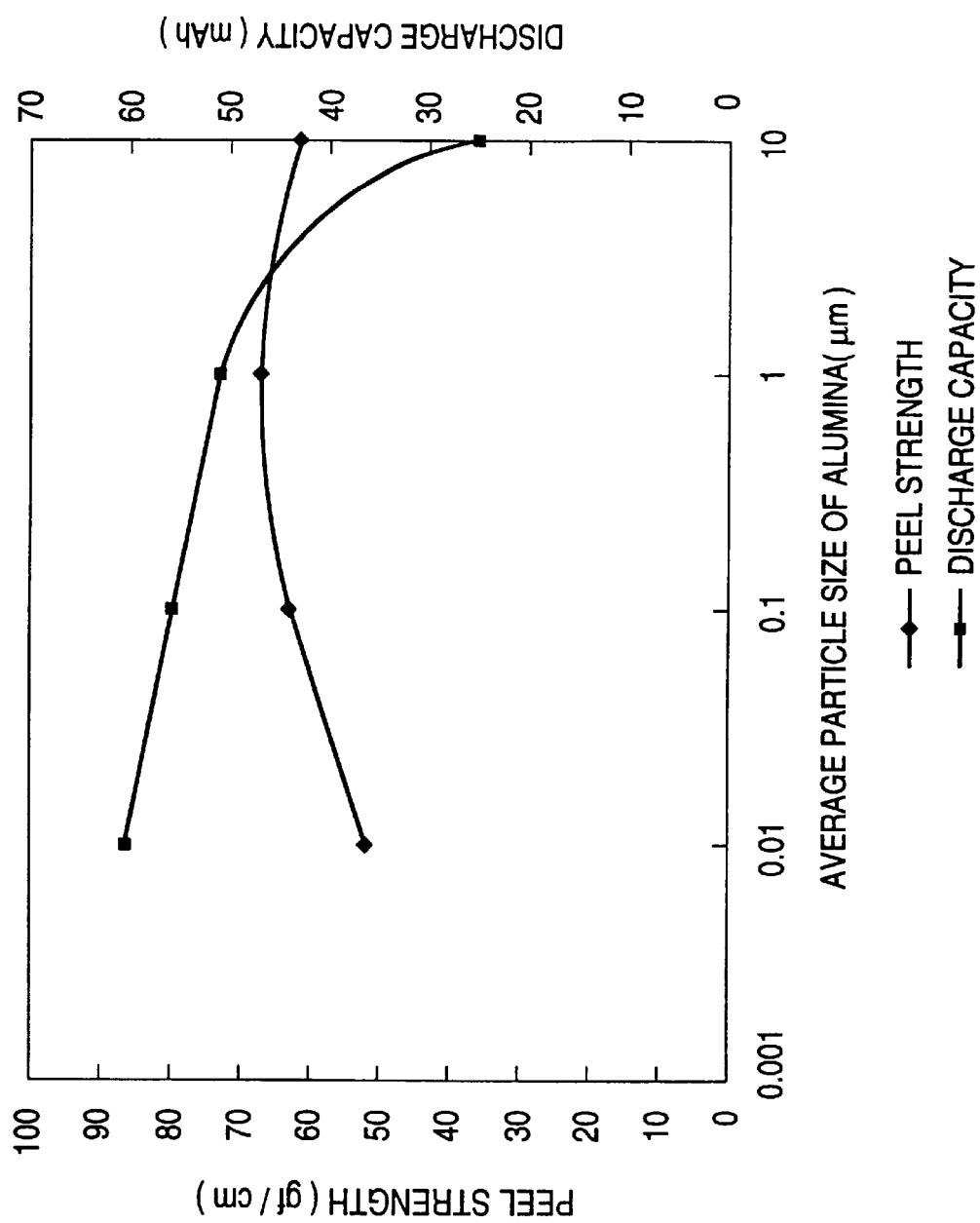
FIG. 5 is a graph showing the relationship between peel strength and discharge capacity with an alumina filler added having a varied average particle size.

Table 2 shows the results obtained with the average particle size of an alumina filler varied and the results obtained with a silica filler having a smaller particle size. These results are shown in FIG. 5, in which the peel strength and the discharge capacity are plotted against the particle size of the alumina filler added. FIG. 5 shows that the peel strength somewhat decreases at a particle size of 1 μm or smaller, which was not problematical for practical use. It is also seen that, on the other hand, the discharge capacity tends to decrease as the average particle size becomes greater than 1 μm because of reduction of void volume in the adhesive resin layer.

TABLE 2

| | Adhesive | | | | | |
|---|---|---|---|---|---|---|
| | Resin | Filler | Weight Ratio | Particle Size of Filler | Peel Strength (gf/cm) | Discharge Capacity (1C) (mAh) |
| Example 1 | PVDF | alumina | 1:1 | 0.01 | 50 | 60 |
| Example 3 | PVDF | alumina | 1:1 | 0.1 | 60 | 55 |
| Example 4 | PVDF | alumina | 1:1 | 1 | 65 | 50 |
| Example 5 | PVDF | silica | 1:1 | 0.007 | 45 | 60 |
| Compara. Example 3 | PVDF | alumina | 1:1 | 10 | 60 | 25 |

Figure 6:
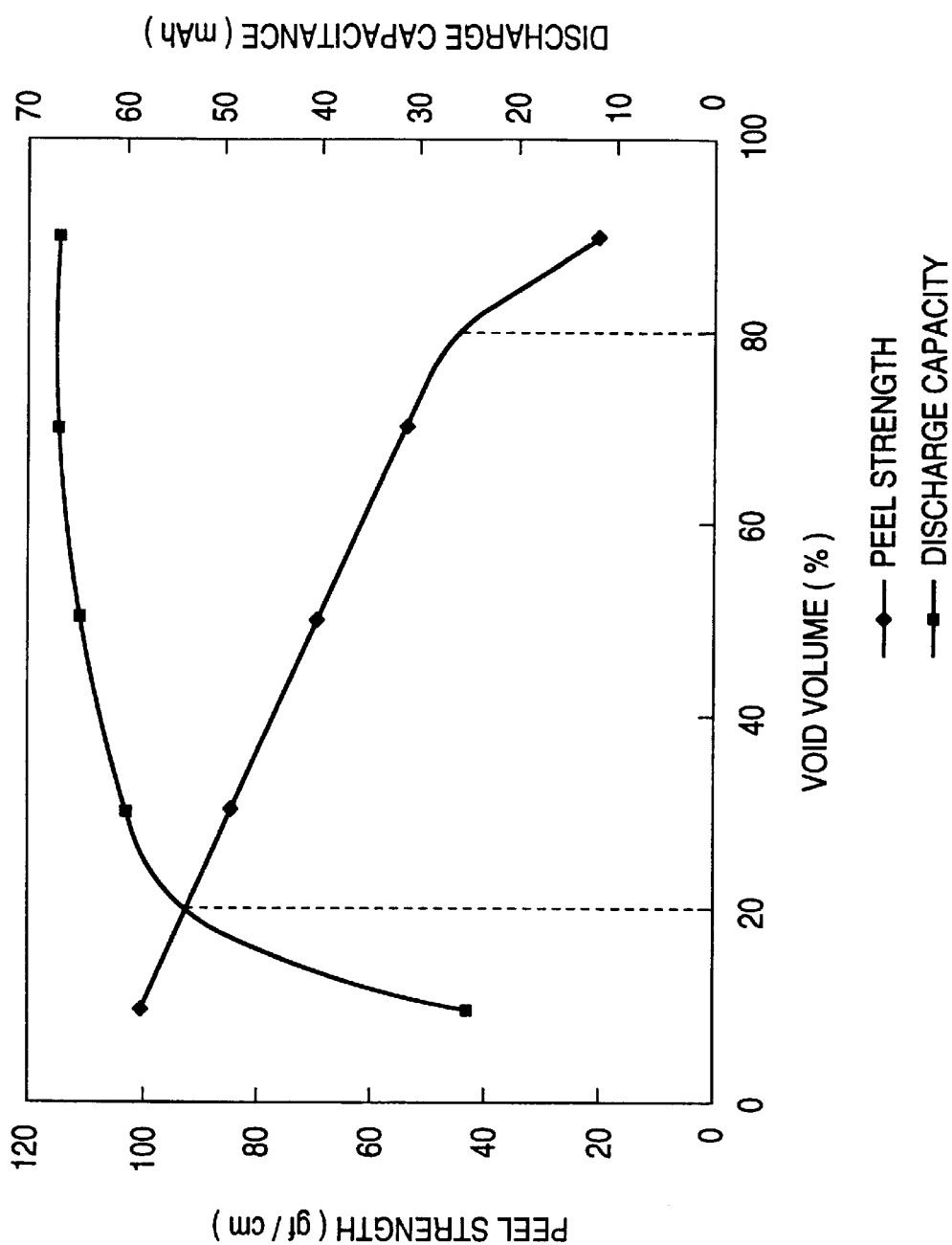
FIG. 6 is a graph showing the relationship between peel strength and discharge capacity against volume percentage of the voids of an adhesive resin layer.

Table 3 shows the results obtained when the ratio of the alumina filler to the adhesive resin was varied. These results are graphed in FIG. 6, in which the peel strength and the battery capacity are plotted against volume percentage of the voids. The proportion of the adhesive resin in the void volume formed by the filler changes with a change of the filler to resin ratio, and a change of the void volume in the adhesive resin layer follows. If the volume percentage of the voids is less than 20%, passages for ions through the adhesive resin layer are diminished, resulting in an obvious reduction in discharge capacity. On the other hand, the adhesive strength tends to reduce with an increase of volume percentage of the voids. If the volume percentage of the voids is more than 80%, the amount of the filler is so large that the amount of the adhesive resin is insufficient, resulting in an extreme reduction in adhesive strength.

Figure 7:
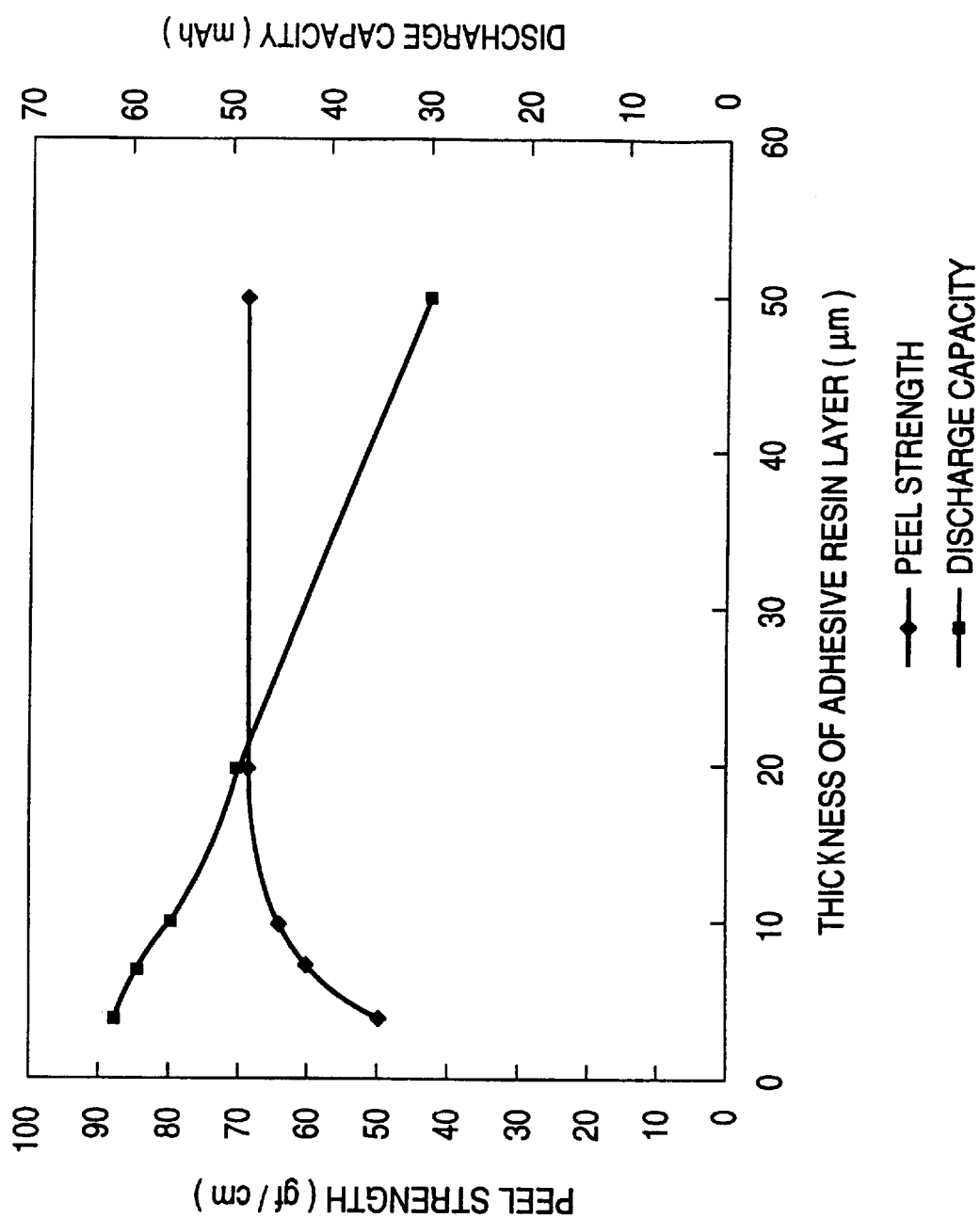
FIG. 7 is a graph showing the relationship between peel strength and discharge capacity against thickness of an adhesive resin layer.

Table 4 shows the results obtained when the thickness of the adhesive resin layer was varied. The peel strength and the discharge capacity are plotted against the thickness in FIG. 7. As can be seen, with a coating thickness of 10 μm or smaller, the adhesive resin layer fills the gap formed by the unevenness of the electrode and the separator so that a high discharge capacity can be secured. If the thickness exceeds 10 μm, the passages for ions are so long that they become resistance and cause gradual reduction of discharge capacity. If the thickness of the adhesive resin layer is increased to about 50 μm, the rate of reduction in discharge capacity is as high as about 50%.

TABLE 3

| | Adhesive | | | | Volume of Solid Matter (%) | Void Volume (%) | Peel Strength (gf/cm) | Discharge Capacity (1C) (mAh) |
|---|---|---|---|---|---|---|---|---|
| | Resin | Filler | Weight Ratio | Particle Size of Filler | | | | |
| Example 1 | PVDF | alumina | 1:1 | 0.01 | 50 | 50 | 70 | 62 |
| Example 6 | PVDF | alumina | 2:1 | 0.01 | 70 | 30 | 85 | 58 |
| Example 7 | PVDF | alumina | 1:5 | 0.01 | 30 | 70 | 60 | 65 |
| Compara. Example 4 | PVDF | alumina | 10:1 | 0.01 | 90 | 10 | 100 | 20 |
| Compara. Example 5 | PVDF | alumina | 1:10 | 0.01 | 10 | 90 | 20 | 65 |

TABLE 4

| | Adhesive | | | | Thickness ($\mu$m) | Peel Strength (gf/cm) | Discharge Capacity (1C) (mAh) |
|---|---|---|---|---|---|---|---|
| | Resin | Filler | Weight Ratio | Particle Size of Filler | | | |
| Example 1 | PVDF | alumina | 1:1 | 0.01 | 4 | 50 | 60 |
| Example 8 | PVDF | alumina | 1:1 | 0.01 | 7 | 60 | 58 |
| Example 9 | PVDF | alumina | 1:1 | 0.01 | 10 | 65 | 55 |
| Example 10 | PVDF | alumina | 1:1 | 0.01 | 20 | 70 | 50 |
| Compara. Example 6 | PVDF | alumina | 1:1 | 0.01 | 50 | 70 | 30 |

FIG. 5 shows the results obtained from different kinds of fillers. It was proved that various fillers produce similar effects. In particular, great effects are obtained with inorganic compounds and polymers.

TABLE 5

| | Adhesive | | | | Peel Strength (gf/cm) | Discharge Capacity (1C) (mAh) |
|---|---|---|---|---|---|---|
| | Resin | Filler | Weight Ratio | Particle Size of Filler | | |
| Example 1 | PVDF | alumina | 1:1 | 0.01 | 50 | 60 |
| Example 11 | PVDF | silica | 1:1 | 0.01 | 50 | 60 |
| Example 12 | PVDF | silicon carbide | 1:3 | 0.5 | 80 | 50 |
| Example 13 | PVDF | boron carbide | 1:3 | 0.5 | 80 | 50 |
| Example 14 | PVDF | silicon nitride | 1:3 | 0.5 | 80 | 50 |
| Example 15 | PVDF | polymethyl methacrylate | 2:1 | 0.5 | 80 | 50 |
| Example 16 | PVDF | iron | 1:2 | 0.5 | 80 | 45 |
| Example 17 | PVDF | carbon | 1:5 | 1 | 50 | 45 |

Table 6 shows the results obtained when two kinds of fillers were used in combination. It is seen that similar effects are produced when fillers are used in various combinations. It is understood, in particular, that materials that contain no conducive materials show great effects.

TABLE 6

| | Adhesive | | | | | | | | |
|---|---|---|---|---|---|---|---|---|---|
| | Resin | | Filler 1 | | | Filler 2 | | | |
| | Kind Kind | Weight Ratio | Kind | Weight Ratio | Average Particle Size | Kind | Weight Ratio | Average Particle Size | Peel Strength | Discharge Capacity (1C) (mAh) |
| Example 1 | PVDF | 1 | alumina | 1 | 0.01 | none | 0 | 0 | 50 | 60 |
| Example 18 | PVDF | 1 | alumina | 0.9 | 0.01 | alumina | 0.1 | 1 | 55 | 55 |
| Example 19 | PVDF | 1 | alumina | 0.5 | 0.01 | silica | 0.5 | 0.01 | 50 | 60 |
| Example 20 | PVDF | 1 | alumina | 0.9 | 0.01 | silica | 0.1 | 0.5 | 55 | 55 |
| Example 21 | PVDF | 1 | alumina | 0.9 | 0.01 | PMMA | 0.1 | 0.5 | 55 | 55 |
| Example 22 | PVDF | 1 | alumina | 0.9 | 0.01 | iron | 0.1 | 0.5 | 55 | 50 |
| Example 23 | PVDF | 1 | alumina | 0.9 | 0.01 | carbon | 0.1 | 1 | 55 | 50 |
| Example 24 | PVDF | 1 | alumina | 0.9 | 0.01 | silicon carbide | 0.1 | 0.5 | 55 | 55 |
| Example 25 | PVDF | 1 | silicon carbide | 0.5 | 0.5 | PMMA | 0.5 | 0.5 | 80 | 55 |
| Example 26 | PVDF | 1 | PMMA | 0.5 | 0.5 | iron | 0.5 | 0.5 | 80 | 45 |
| Example 27 | PVDF | 1 | PMMA | 0.5 | 0.5 | carbon | 0.5 | 1 | 80 | 45 |

Table 7 shows the results of testing on battery characteristics of various battery structures. It proves that satisfactory battery characteristics can be obtained irrespective of the battery structure. In particular, it is seen that high-performance batteries having a high battery capacity can be obtained when the invention is applied to a laminated battery body composed of a plurality of unit electrode bodies.

TABLE 7

| | Adhesive | | | | | Discharge |
|---|---|---|---|---|---|---|
| | Resin | Filler | Weight Ratio | Particle Size of Filler | Battery Structure | Capacity (1C) (mAh) |
| Example 1 | PVDF | alumina | 1:1 | 0.01 | tabular unit electrode type | 60 |
| Example 23 | PVDF | alumina | 1:1 | 0.01 | tabular laminated electrode type | 360 |
| Example 29 | PVDF | alumina | 1:1 | 0.01 | tabular laminated electrode type | 360 |
| Example 30 | PVDF | alumina | 1:1 | 0.01 | tabular rolled electrode type | 360 |
| Example 31 | PVDF | alumina | 1:1 | 0.01 | tabular rolled electrode type | 360 |
| Example 32 | PVDF | alumina | 1:1 | 0.01 | tabular rolled electrode type | 360 |
| Example 33 | PVDF | alumina | 1:1 | 0.01 | tabular rolled electrode type | 360 |

INDUSTRIAL APPLICABILITY

The battery according to the invention is used as a secondary battery, etc. in portable electronic equipment and has reduced size and weight as well as improved battery performance.

What is claimed is:

1. A battery comprising a battery body including:
   a positive electrode and a negative electrode each containing an active material;
   a separator holding an electrolyte; and
   an adhesive resin layer joining at least one of the positive and the negative electrodes to the separator,
   wherein said adhesive resin layer contains a particulate, electrically non-conductive material or semiconductor as a filler which provides passages through the resin layer through which ions pass, wherein the average particle size of the filler particles is equal to or smaller than the particle size of the active material which constitutes each electrode.

2. A battery according to claim 1, wherein that said electrolyte is an organic electrolyte containing lithium ions.

3. A battery according to claim 1, wherein said average particle size of said filler is 1 $\mu$m or smaller.

4. A battery according to claim 1, wherein the sum of a volume ratio of the adhesive resin and that of the filler per unit volume of said adhesive resin layer is less than 1.

5. A battery according to claim 4, wherein the sum of a volume ratio of the adhesive resin and that of the filler per unit volume of said adhesive resin layer is 0.2 to 0.8.

6. A battery according to claim 1, wherein said adhesive resin layer is constituted so as to fill the vacancies formed in the interface between each electrode and the separator due to the unevenness of the electrode and the separator.

7. A battery according to claim 1, wherein said battery body is a laminate of a plurality of electrode bodies each composed of a single layer of the positive electrode, a single layer of the separator, and a single layer of the negative electrode.

8. A battery according to claim 7, wherein said laminate is formed by interposing the positive electrode and the negative electrode alternately among a plurality of the separators.

9. A battery according to claim 7, wherein said laminate is formed by interposing the positive electrode and the negative electrode alternately between rolled separators.

10. A battery according to claim 7, wherein said laminate is formed by interposing the positive electrode and the negative electrode alternately between folded separators.

11. A battery according to claim 1, wherein the adhesive resin layer is porous and thereby contains electrolytes which permits the resin layer to exhibit ionic conductivity.

12. A battery comprising a battery body including:
- a positive electrode and a negative electrode each containing an active material;
- a separator holding an electrolyte; and
- an adhesive resin layer joining at least one of the positive and the negative electrodes to the separator,
- wherein said adhesive resin layer comprises a layer containing an electrically conductive filler and a layer containing at least one of non-electrically conductive and semiconductor filler, the fillers in the adhesive resin layer providing passages through which ions pass.

13. A battery according to claim 12, wherein that said electrolyte is an organic electrolyte containing lithium ions.

14. A battery according to claim 12, wherein that the average particle size of said filler is equal to or smaller than the particle size of the active material constituting each electrode.

15. A battery according to claim 14, wherein said average particle size of said filler is 1 $\mu$m or smaller.

16. A battery according to claim 12, wherein the sum of a volume ratio of the adhesive resin and that of the filler per unit volume of said adhesive resin layer is less than 1.

17. A battery according to claim 16, wherein the sum of a volume ratio of the adhesive resin and that of the filler per unit volume of said adhesive resin layer is 0.2 to 0.8.

18. A battery according to claim 12, wherein said adhesive resin layer is constituted so as to fill the vacancies formed in the interface between each electrode and the separator which is attributable to the unevenness of the electrode and the separator.

19. A battery according to claim 12, wherein said battery body is a laminate of a plurality of electrode bodies each composed of a single layer of the positive electrode, a single layer of the separator, and a single layer of the negative electrode.

20. A battery according to claim 19, wherein said laminate is formed by interposing the positive electrode and the negative electrode alternately among a plurality of the separators.

21. A battery according to claim 19, wherein said laminate is formed by interposing the positive electrode and the negative electrode alternately between rolled separators.

22. A battery according to claim 19, wherein said laminate is formed by interposing the positive electrode and the negative electrode alternately between folded separators.

23. A battery according to claim 12, wherein the adhesive resin layer is porous and thereby contains electrolytes which permit the resin layer to exhibit ionic conductivity.

* * * * *